United States Patent
Dudley et al.

(10) Patent No.: US 10,594,004 B2
(45) Date of Patent: Mar. 17, 2020

(54) BATTERY PACK

(71) Applicant: LG Chem, Ltd., Seoul (KR)

(72) Inventors: Scott Dudley, Commerce Township, MI (US); Amanda Nowicki, Plymouth, MI (US)

(73) Assignee: LG Chem, Ltd., Seoul (KR)

( * ) Notice: Subject to any disclaimer, the term of this patent is extended or adjusted under 35 U.S.C. 154(b) by 312 days.

(21) Appl. No.: 15/446,733

(22) Filed: Mar. 1, 2017

(65) Prior Publication Data

US 2018/0166754 A1  Jun. 14, 2018

Related U.S. Application Data

(60) Provisional application No. 62/432,954, filed on Dec. 12, 2016.

(51) Int. Cl.

| | |
|---|---|
| *H01M 10/0525* | (2010.01) |
| *H01M 10/617* | (2014.01) |
| *H01M 10/647* | (2014.01) |
| *H01M 10/653* | (2014.01) |
| *H01M 10/613* | (2014.01) |
| *H01M 2/10* | (2006.01) |

(Continued)

(52) U.S. Cl.
CPC ....... *H01M 10/617* (2015.04); *H01M 2/1077* (2013.01); *H01M 10/613* (2015.04); *H01M 10/6556* (2015.04); *H01M 10/6567* (2015.04); *H01M 10/647* (2015.04); *H01M 10/6555* (2015.04)

(58) Field of Classification Search
None
See application file for complete search history.

(56) References Cited

U.S. PATENT DOCUMENTS

| 6,783,630 B2 | 8/2004 | Shajii et al. |
|---|---|---|
| 7,166,187 B2 | 1/2007 | Shajii et al. |

(Continued)

FOREIGN PATENT DOCUMENTS

| EP | 2742557 A1 | 6/2014 |
|---|---|---|
| JP | 2005183343 A | 7/2005 |

(Continued)

OTHER PUBLICATIONS

KR20140077272—Machine translation (Year: 2014).*

(Continued)

*Primary Examiner* — Haroon S. Sheikh
(74) *Attorney, Agent, or Firm* — Buckert Patent & Trademark Law Firm PC; John F. Buckert

(57) ABSTRACT

A battery pack having a battery module and a cooling plate are provided. The battery pack has a bottom surface and a first plane that extends through the battery module parallel to the bottom surface. The cooling plate has a bottom pan and a top plate that are coupled together and extend along a longitudinal axis. The bottom surface of the battery module is disposed on the top plate. The bottom pan has a first cooling region with first and second flow path patterns therein that receive a refrigerant therethrough. The first and second flow path pattern are shaped and sized to maintain a temperature of first and second halves, respectively, of a cross-sectional area of the battery module within one degree Celsius of a first temperature level.

13 Claims, 12 Drawing Sheets

(51) Int. Cl.
　　　*H01M 10/6556*　　(2014.01)
　　　*H01M 10/6567*　　(2014.01)
　　　H01M 10/6555　　(2014.01)

(56) References Cited

U.S. PATENT DOCUMENTS

| | | |
|---|---|---|
| 9,537,127 B2 | 1/2017 | Schreiber et al. |
| 9,627,724 B2 | 4/2017 | Yum et al. |
| 2005/0153199 A1 | 7/2005 | Yagi et al. |
| 2007/0227697 A1* | 10/2007 | Takahashi ............ H01L 23/473 165/80.4 |
| 2008/0299448 A1* | 12/2008 | Buck ................ H01M 10/6553 429/120 |
| 2013/0192507 A1 | 8/2013 | Chu et al. |
| 2014/0305622 A1 | 10/2014 | Daubitzer et al. |
| 2016/0036104 A1* | 2/2016 | Kenney ............ H01M 10/6556 429/120 |
| 2016/0248134 A1 | 8/2016 | Morse et al. |

FOREIGN PATENT DOCUMENTS

| | | |
|---|---|---|
| JP | 2008181735 A | 8/2008 |
| KR | 20140026961 A | 3/2014 |
| KR | 20140077272 A | 6/2014 |
| KR | 20150081516 A | 7/2015 |
| KR | 20160067711 A | 6/2016 |

OTHER PUBLICATIONS

U.S. Appl. No. 15/149,288, filed May 9, 2016 entitled Thermally Conductive Base Member and Method of Assembling the Thermally Conductive Base Member.

* cited by examiner

BATTERY PACK

CROSS-REFERENCE TO RELATED APPLICATION

This application claims priority to U.S. Provisional Patent Application No. 62/432,954 filed on Dec. 12, 2016, the entire contents of which are hereby incorporated by reference herein.

BACKGROUND

A battery pack has a battery module therein. A problem with known battery packs is that various cooling methodologies utilized to cool the battery packs have not been able to maintain a temperature of a cross-sectional area of a battery module within one degree Celsius of a desired temperature level during operation, wherein the cross-sectional area of the battery module is parallel to a bottom surface of the battery module. During operation, centrally located battery cells in a battery module have a temperature greater than one degree Celsius from a temperature of other battery cells in the battery module which can degrade the centrally located battery cells more quickly than the remaining battery cells.

The inventors herein have recognized a need for an improved battery pack that eliminates the above-identified problem.

SUMMARY

A battery pack in accordance with an exemplary embodiment is provided. The battery pack includes a battery module having a bottom surface and a first plane that extends through the battery module parallel to the bottom surface. The battery pack further includes a cooling plate having a bottom pan and a top plate that are coupled together and extend along a longitudinal axis. The bottom surface of the battery module is disposed on the top plate. The bottom pan and the top plate define an interior region therebetween. The bottom pan has a first cooling region with first and second flow path patterns therein that receive a refrigerant therethrough. The first flow path pattern is shaped and sized to maintain a temperature of at least a first half of a cross-sectional area of the battery module within one degree Celsius of a first temperature level. The second flow path pattern is shaped and sized to maintain a temperature of at least a second half of the cross-sectional area of the battery module within one degree Celsius of the first temperature level. The first half of the cross-sectional area of the battery module and the second half of the cross-sectional area of the battery module is coincident and parallel with the first plane.

DETAILED DESCRIPTION

Figure 1:
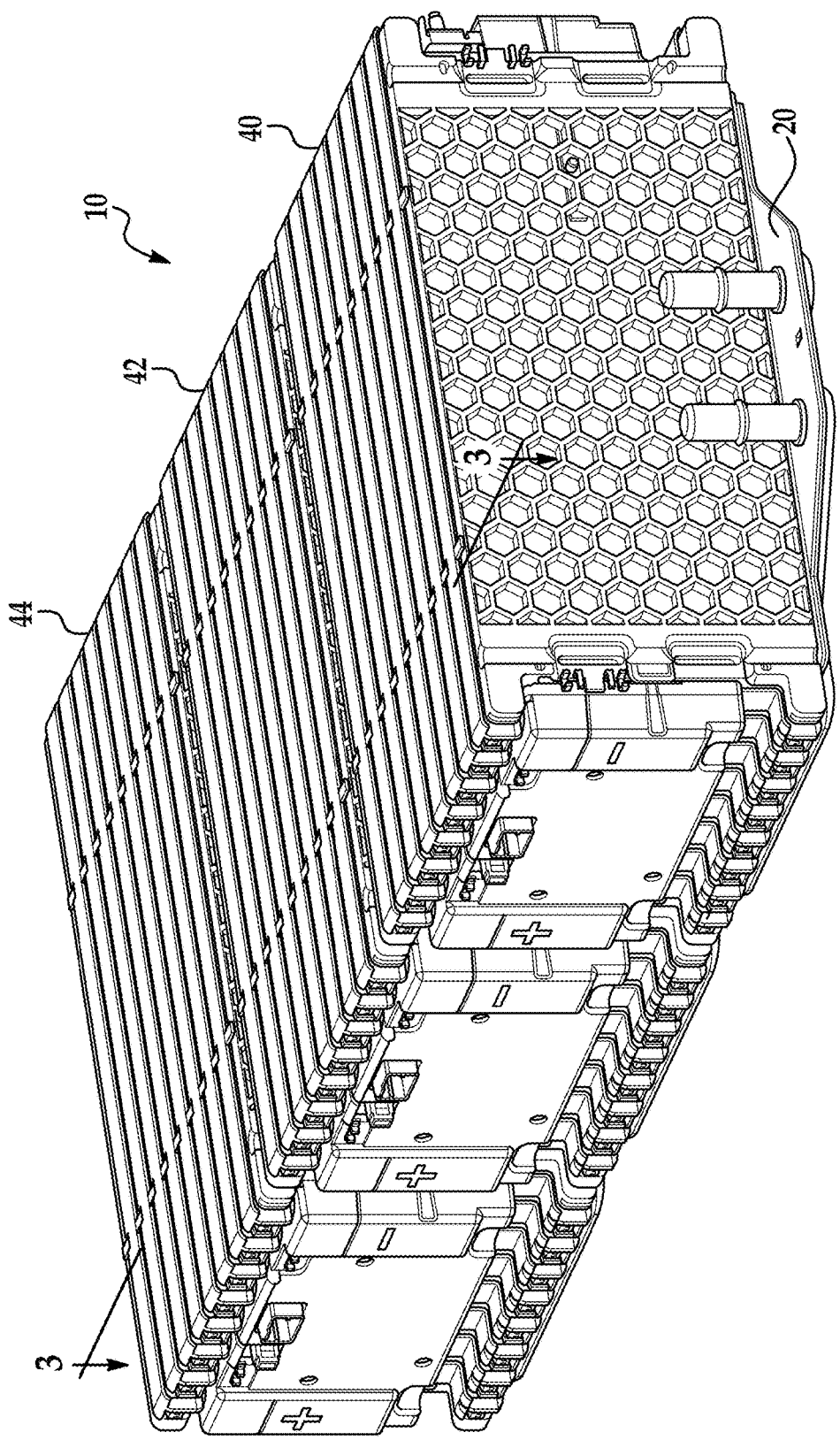
FIG. 1 is a schematic of a battery pack in accordance with an exemplary embodiment.
Figure 2:
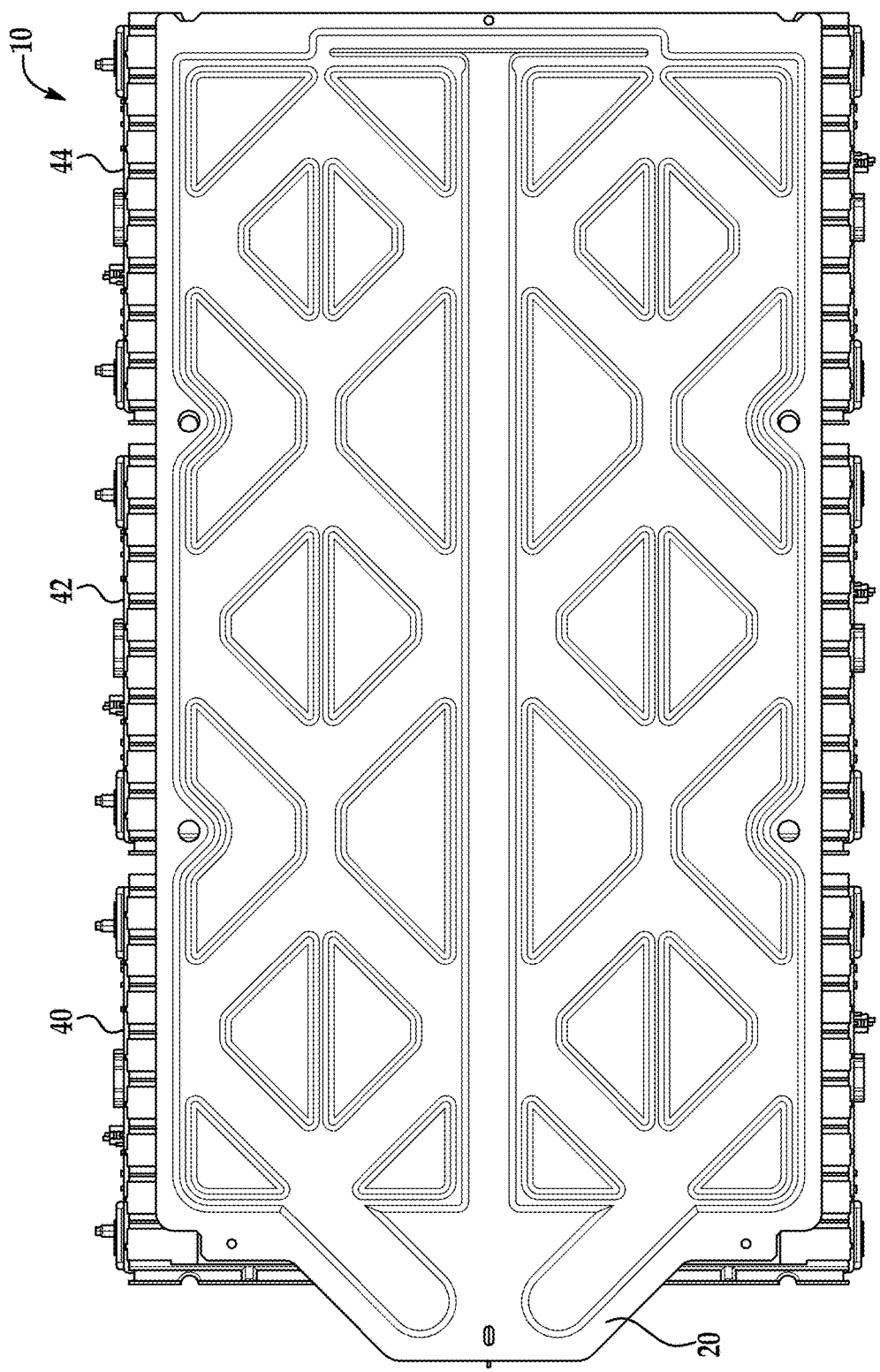
FIG. 2 is a schematic of a bottom view of the battery pack of FIG. 1.

Referring to FIGS. 1-13, a battery pack 10 in accordance with an exemplary embodiment is provided. The battery pack 10 includes a cooling plate 20 in accordance with an exemplary embodiment, and battery modules 40, 42, 44. An advantage of the cooling plate 20 is that the cooling plate 20 has a flow path pattern 370 (shown in FIG. 8) that is shaped and sized to maintain a temperature of at least a first half of a cross-sectional area of the battery module 40 taken along a plane 1000 (shown in FIG. 3) within one degree Celsius of a first temperature level, and a flow path pattern 372 (shown in FIG. 8) that is shaped and sized to maintain a temperature of at least a second half of the cross-sectional area of the battery module 40 along the plane 1000 within one degree Celsius of the first temperature level.

Referring to FIGS. 4-10, the cooling plate 20 is provided to cool the battery modules 40, 42, 44 utilizing a refrigerant flowing through the cooling plate 20 from a refrigerant source. The cooling plate 20 includes a bottom pan 60, a top plate 62, a tubular inlet port 64, and a tubular outlet port 66.

Referring to FIGS. 6, 8, 10 and 11, the bottom pan 60 is coupled to the top plate 62. The bottom pan includes a bottom plate portion 80, outer side wall portions 82, 83, 84, 86, 88, 90, 92, 94, 96, 97, 98, inner side wall portions 110, 112, 114, 116, peripheral ledge portions 120, 124, 126, 128, triangular-shaped raised portions 150, 152, 198, 200, 250, 252, 298, 300, acute trapezoidal-shaped raised portions 154, 156, 158, 160, 174, 176, 178, 180, 194, 196, 254, 256, 258, 260, 274, 276, 278, 280, 294, 296. In an exemplary embodiment, the bottom pan 60 is constructed of a metal such as aluminum for example.

Figure 6:
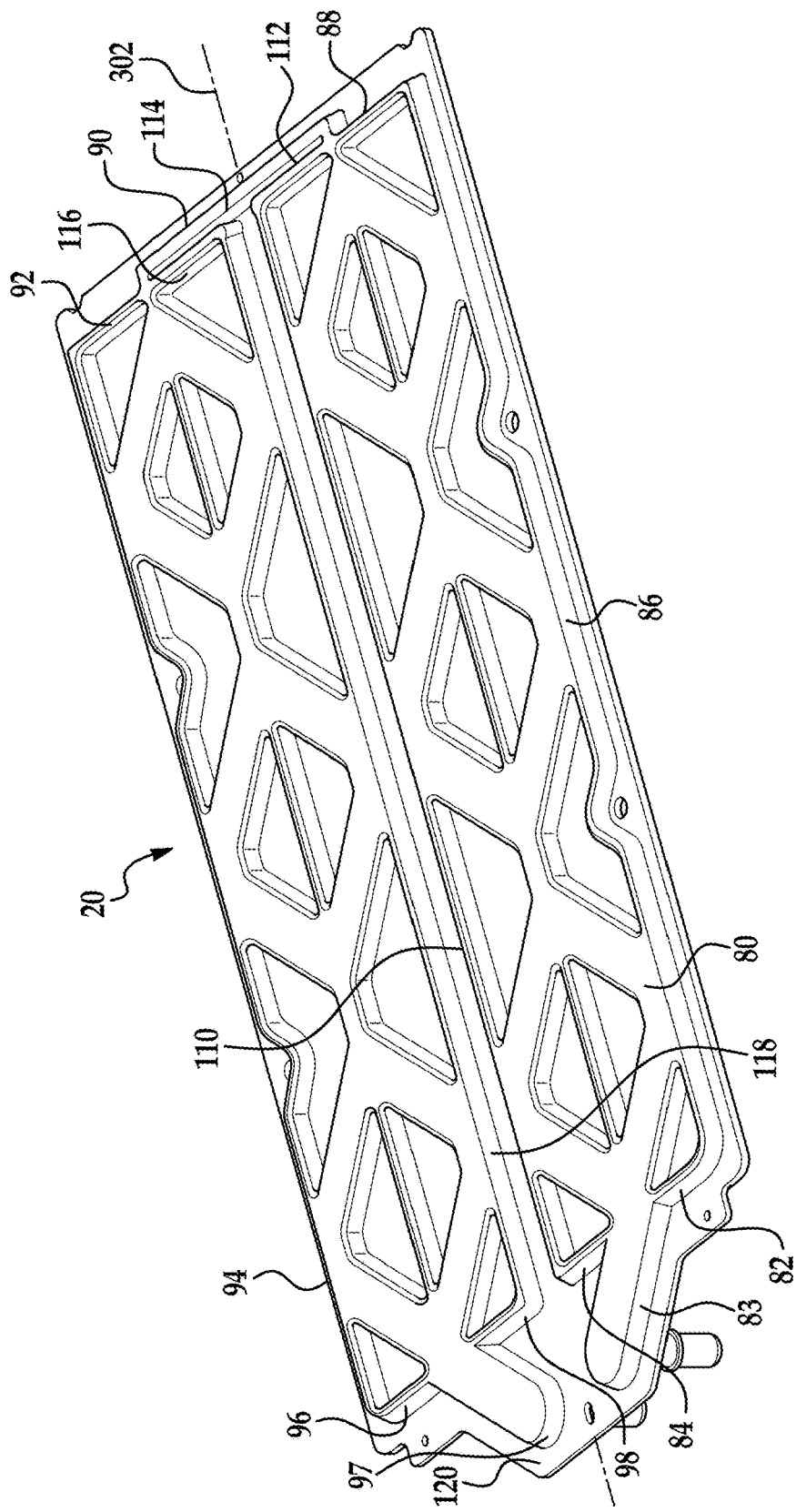
FIG. 6 is another schematic of the cooling plate of FIG. 4.
Figure 8:
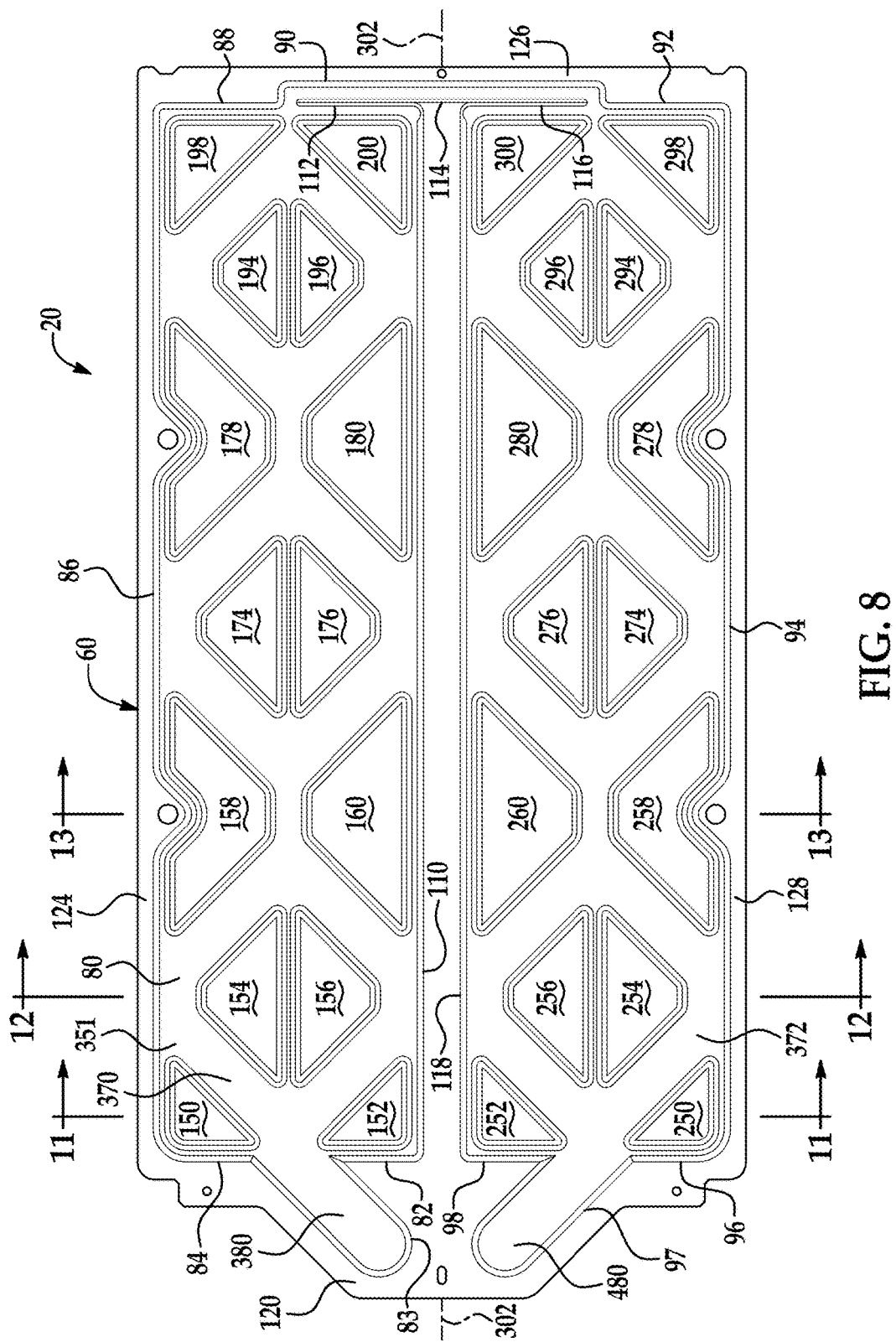
FIG. 8 is a schematic of a top view of a bottom pan utilized in the cooling plate of FIG. 4.
Figure 10:
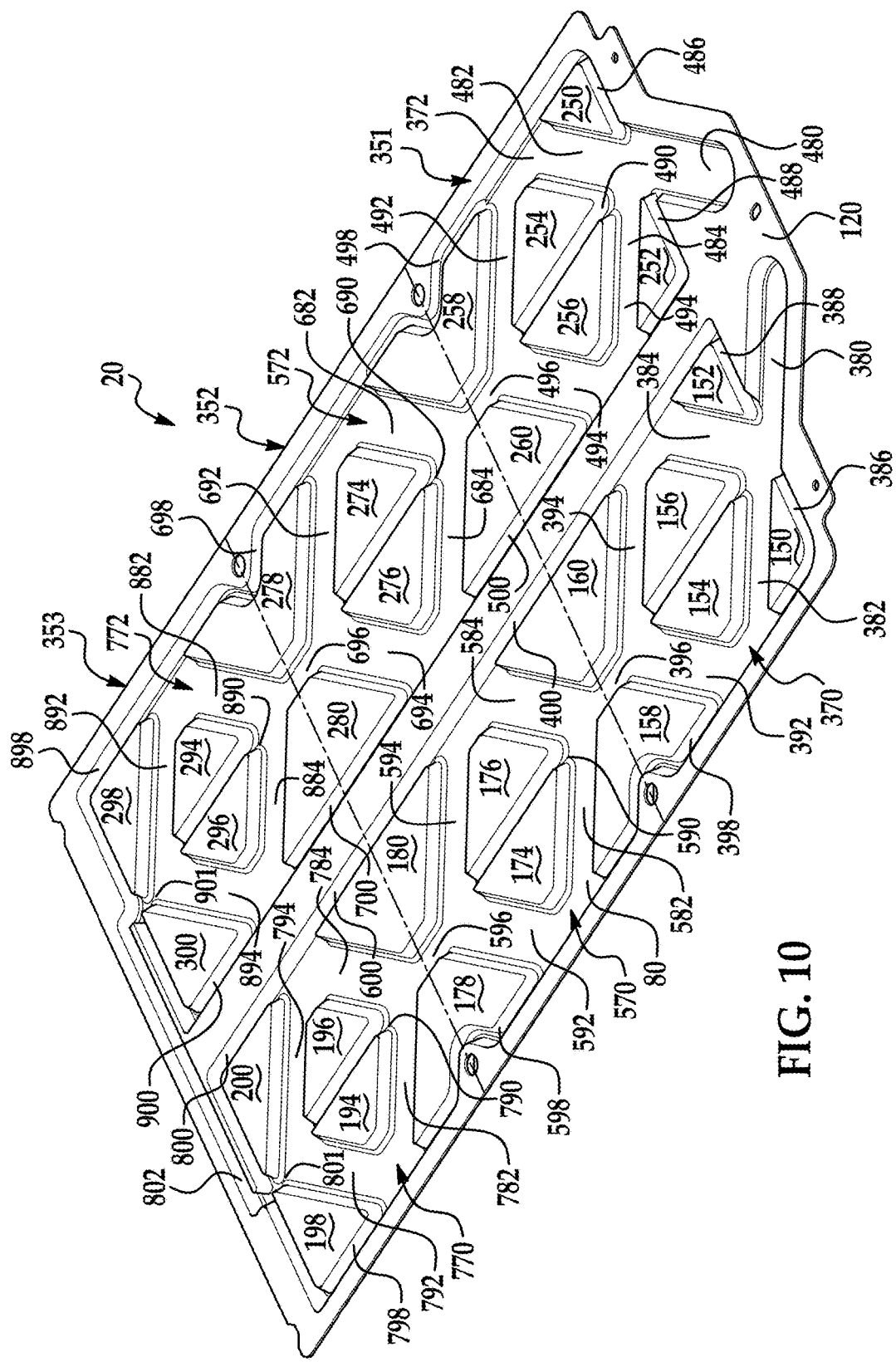
FIG. 10 is another schematic of the bottom pan of FIG. 8.
Figure 11:
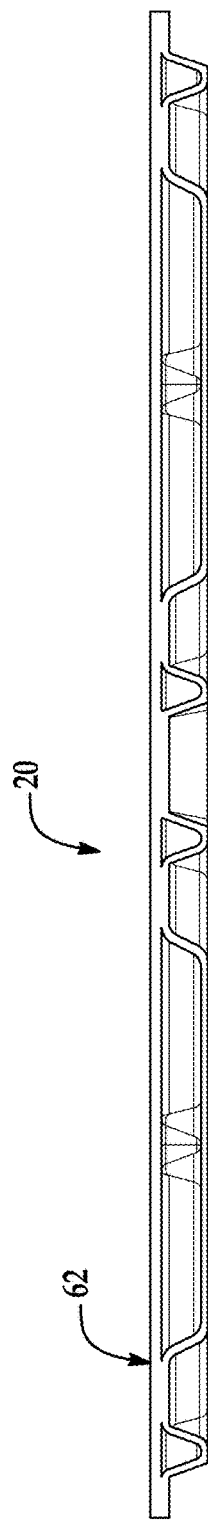
FIG. 11 is a cross-sectional schematic of the cooling plate of FIG. 5 along lines 11-11 in FIG. 5.
Figure 12:
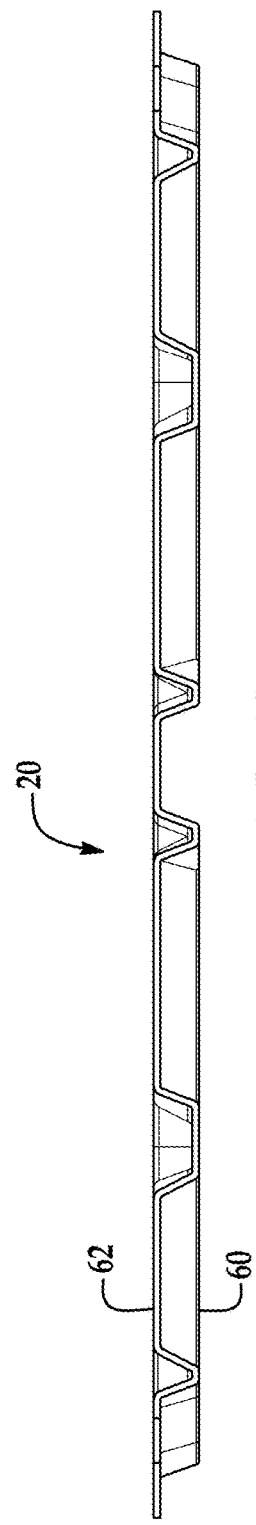
FIG. 12 is a cross-sectional schematic of the cooling plate of FIG. 5 along lines 12-12 in FIG. 5.
Figure 13:
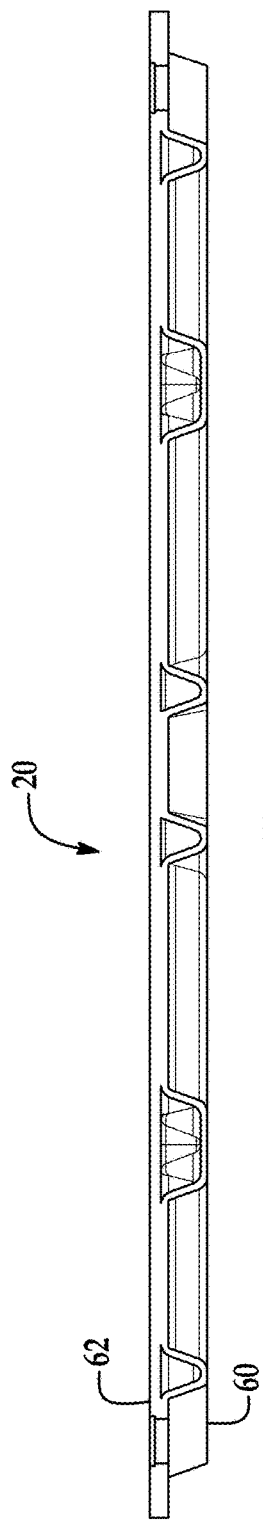
FIG. 13 is a cross-sectional schematic of the cooling plate of FIG. 5 along lines 13-13 in FIG. 5.

Referring to FIGS. 6, 8 and 10, outer side wall portions 82, 83, 84 are coupled to the bottom plate portion 80 and extend in a first direction away from the bottom plate portion 80. The outer side wall portions 82, 83, 84 are disposed proximate to a first end of the bottom pan 60. The outer side wall portions 82, 84 extend substantially perpendicular to a longitudinal axis 302 (shown in FIG. 6) of the cooling plate 20, and are further disposed co-linear with each other. The outer side wall portion 83 is coupled to and between the outer side wall portions 82, 84.

The outer side wall portion 86 is coupled to the bottom plate portion 80 and extends in the first direction away from the bottom plate portion 80. The outer side wall portion 86 is coupled to and extends between the outer side wall portions 84, 88 and extends substantially parallel to the longitudinal axis 302.

The outer side wall portion 88 and the inner side wall portion 112 are coupled to the bottom plate portion 80 and extend in the first direction away from the bottom plate portion 80. The outer side wall portion 88 and the inner side wall portion 112 are disposed proximate to a second end of the bottom pan 60 and substantially perpendicular to the longitudinal axis 302 (shown in FIG. 6) of the cooling plate 20, and are further disposed co-linear with each other.

The inner side wall portion 110 is coupled to the bottom plate portion 80 and extends in the first direction away from the bottom plate portion 80. The inner side wall portion 110 is further coupled to and extends between the outer side wall portion 82 and the inner side wall portion 112. Also, the inner side wall portion 110 extends substantially parallel to the longitudinal axis 302.

The outer side wall portion 90 and the inner side wall portion 114 are coupled to the bottom plate portion 80 and extend in the first direction away from the bottom plate portion 80. The outer side wall portion 90 and the inner side wall portion 114 are disposed proximate to the second end of the bottom pan 60 and substantially perpendicular to the longitudinal axis 302 (shown in FIG. 6) of the cooling plate 20, and are further disposed parallel and apart from one another. The outer side wall portion 90 and the inner side wall portion 114 define a flow path portion 802 (shown in FIG. 10 therebetween).

The inner side wall portion 116 and the outer side wall portion 92 are coupled to the bottom plate portion 80 and extend in the first direction away from the bottom plate portion 80. The inner side wall portion 116 and the outer side wall portion 92 are disposed proximate to the second end of the bottom pan 60 and substantially perpendicular to the longitudinal axis 302 (shown in FIG. 6) of the cooling plate 20, and are further disposed co-linear with one another.

The outer side wall portion 94 is coupled to the bottom plate portion 80 and extends in the first direction away from the bottom plate portion 80. The outer side wall portion 94 is coupled to and extends between outer side wall portions 92, 96 and extends substantially parallel to the longitudinal axis 302.

The outer side wall portions 96, 97, 98 are coupled to the bottom plate portion 80 and extend in a first direction away from the bottom plate portion 80. The outer side wall portions 96, 97, 98 are disposed proximate to the first end of the bottom pan 60. The outer side wall portions 96, 98 extend substantially perpendicular to the longitudinal axis 302 (shown in FIG. 6) of the cooling plate 20, and are further disposed co-linear with each other. The outer side wall portion 97 is coupled to and between the outer side wall portions 96, 98.

The inner side wall portion 118 is coupled to the bottom plate portion 80 and extends in the first direction away from the bottom plate portion 80. The inner side wall portion 118 is further coupled to and extends between the outer side wall portion 98 and the inner side wall portion 116. Also, the inner side wall portion 118 extends substantially parallel to the longitudinal axis 302.

Referring to FIG. 8, the peripheral ledge portions 120, 124, 126, 128 form an outer periphery of the bottom pan 60 and are substantially co-planar with one another. Further, the peripheral ledge portions 120, 124, 126, 128 are coupled to the top plate 62.

The peripheral ledge portion 120 is coupled to the outer side wall portions 82, 83, 84, 96, 96, 98 and is disposed a predetermined distance from the bottom plate portion 80 and substantially parallel to the bottom plate portion 80.

The peripheral ledge portion 124 is coupled to the outer side wall portion 86 and is disposed a predetermined distance from the bottom plate portion 80 and substantially parallel to the bottom plate portion 80.

The peripheral ledge portion 126 is coupled to the outer side wall portions 88, 90, 92 and is disposed a predetermined distance from the bottom plate portion 80 and substantially parallel to the bottom plate portion 80.

The peripheral ledge portion 128 is coupled to the outer side wall portion 94 and is disposed a predetermined distance from the bottom plate portion 80 and substantially parallel to the bottom plate portion 80.

Referring to FIGS. 8 and 10, the triangular-shaped raised portions 150, 152, 198, 200, 250, 252, 298, 300 and the acute trapezoidal-shaped raised portions 154, 156, 158, 160, 174, 176, 178, 180, 194, 196, 254, 256, 258, 260, 274, 276, 278, 280, 294, 296 are coupled to and extend in the first direction away from the bottom plate portion 80. Further, the triangular-shaped raised portions 150, 152, 198, 200, 250, 252, 298, 300 and the acute trapezoidal-shaped raised portions 154, 156, 158, 160, 174, 176, 178, 180, 194, 196, 254, 256, 258, 260, 274, 276, 278, 280, 294, 296 directly contact and are coupled to the top plate 62.

Referring to FIGS. 6, 8 and 10, the triangular-shaped raised portions, the acute trapezoidal-shaped raised portions, and the associated flow channels in the top half (shown in FIG. 8) of the bottom pan 60 will now be described.

The bottom plate portion 80, the side wall 83, and the triangular-shaped raised portions 150, 152 define the flow channel 380 (shown in FIG. 10) therebetween.

The triangular-shaped raised portion 150 and the acute trapezoidal-shaped raised portion 154 and the bottom plate portion 80 define a flow channel 382. The flow channel 382 is disposed between outer surfaces of the triangular-shaped raised portion 150 and the acute trapezoidal-shaped raised portion 154 and fluidly communicates with the flow channel 380.

The triangular-shaped raised portion 152 and the acute trapezoidal-shaped raised portion 156, and the bottom plate portion 80 define a flow channel 384. The flow channel 384 is disposed between outer surfaces of the triangular-shaped raised portion 152 and the acute trapezoidal-shaped raised portion 156 and fluidly communicates with the flow channel 380.

The triangular-shaped raised portion 150, the outer side wall portions 84, 86 and the bottom plate portion 80 define a flow channel 386 that fluidly communicates with the flow channel 380.

The triangular-shaped raised portion 152, the outer side wall portion 82, the inner side wall portion 110 (shown in FIG. 6) and the bottom plate portion 80 define a flow channel 388 that fluidly communicates with the flow channel 380.

The acute trapezoidal-shaped raised portions 154, 156 and the bottom plate portion 80 define a flow channel 390. The flow channel 390 is disposed between the acute trapezoidal-shaped raised portions 154, 156 and fluidly communicates with the flow channel 380.

The acute trapezoidal-shaped raised portions 154, 158 and the bottom plate portion 80 define a flow channel 392. The flow channel 392 is disposed between outer surfaces of the acute trapezoidal-shaped raised portions 154, 158 and fluidly communicates with the flow channels 382, 386.

The acute trapezoidal-shaped raised portions 156, 160 and the bottom plate portion 80 define a flow channel 394. The flow channel 394 is disposed between outer surfaces of the acute trapezoidal-shaped raised portions 156, 160 and fluidly communicates with the flow channels 384, 388.

The acute trapezoidal-shaped raised portions 158, 160 and the bottom plate portion 80 define a flow channel 396. The flow channel 396 is disposed between outer surfaces of the acute trapezoidal-shaped raised portions 158, 160 and fluidly communicates with the flow channels 392, 394.

The acute trapezoidal-shaped raised portion 158, the outer side wall portion 86 and the bottom plate portion 80 define a flow channel 398 that fluidly communicates with the flow channels 382, 386.

The acute trapezoidal-shaped raised portion 160, the inner side wall portion 110 and the bottom plate portion 80 define a flow channel 400 that fluidly communicates with the flow channels 384, 388.

The acute trapezoidal-shaped raised portions 174, 158 and the bottom plate portion 80 define a flow channel 582. The flow channel 582 is disposed between the acute trapezoidal-shaped raised portions 174, 158 and fluidly communicates with the flow channel 396.

The acute trapezoidal-shaped raised portions 160, 176 and the bottom plate portion 80 define a flow channel 584. The flow channel 584 is disposed between outer surfaces of the acute trapezoidal-shaped raised portions 160, 176 and fluidly communicates with the flow channel 396.

The acute trapezoidal-shaped raised portions 174, 176 and the bottom plate portion 80 define a flow channel 590. The flow channel 590 is disposed between the acute trapezoidal-shaped raised portions 174, 176 and fluidly communicates with the flow channel 396.

The acute trapezoidal-shaped raised portions 174, 178 and the bottom plate portion 80 define a flow channel 592. The flow channel 592 is disposed between outer surfaces of the acute trapezoidal-shaped raised portions 174, 178 and fluidly communicates with the flow channels 582, 398.

The acute trapezoidal-shaped raised portions 176, 180 and the bottom plate portion 80 define a flow channel 594. The flow channel 594 is disposed between outer surfaces of the acute trapezoidal-shaped raised portions 176, 180 and fluidly communicates with the flow channels 584, 400.

The acute trapezoidal-shaped raised portions 178, 180 and the bottom plate portion 80 define a flow channel 596. The flow channel 596 is disposed between outer surfaces of the acute trapezoidal-shaped raised portions 178, 180 and fluidly communicates with the flow channels 592, 594.

The acute trapezoidal-shaped raised portion 178, the outer side wall portion 86 and the bottom plate portion 80 define a flow channel 598 that fluidly communicates with the flow channels 582, 398.

The acute trapezoidal-shaped raised portion 180, the inner side wall portion 110 and the bottom plate portion 80 define a flow channel 600 that fluidly communicates with the flow channels 584, 400.

The acute trapezoidal-shaped raised portions 194, 178 and the bottom plate portion 80 define a flow channel 782. The flow channel 782 is disposed between the acute trapezoidal-shaped raised portions 194, 178 and fluidly communicates with the flow channel 596.

The acute trapezoidal-shaped raised portions 180, 196 and the bottom plate portion 80 define a flow channel 784. The flow channel 784 is disposed between outer surfaces of the acute trapezoidal-shaped raised portions 180, 196 and fluidly communicates with the flow channel 596.

The acute trapezoidal-shaped raised portions 194, 196 and the bottom plate portion 80 define a flow channel 790. The flow channel 790 is disposed between the acute trapezoidal-shaped raised portions 194, 196 and fluidly communicates with the flow channel 596.

The acute trapezoidal-shaped raised portions 194, 198 and the bottom plate portion 80 define a flow channel 792. The flow channel 792 is disposed between outer surfaces of the acute trapezoidal-shaped raised portions 194, 198 and fluidly communicates with the flow channels 782, 598.

The acute trapezoidal-shaped raised portions 196, 200 and the bottom plate portion 80 define a flow channel 794. The flow channel 794 is disposed between outer surfaces of the acute trapezoidal-shaped raised portions 196, 200 and fluidly communicates with the flow channels 784, 600.

The acute trapezoidal-shaped raised portion 198, the outer side wall portions 86, 88 and the bottom plate portion 80 define a flow channel 798 that fluidly communicates with the flow channels 782, 598.

The acute trapezoidal-shaped raised portion 200, the inner side wall portions 110, 112, (shown in FIG. 6) and the bottom plate portion 80 define a flow channel 800 that fluidly communicates with the flow channels 784, 600.

The acute trapezoidal-shaped raised portions 198, 200 and the bottom plate portion 80 define a flow channel 801. The flow channel 801 is disposed between the acute trapezoidal-shaped raised portions 198, 200 and fluidly communicates with the flow channels 792, 794, 798, 800.

The outer side wall portion 90 and the inner side wall portion 114 and the bottom plate portion 80 define a flow channel 802. The flow channel 802 is disposed between the outer side wall portion 90 and the inner side wall portion 114 and fluidly communicates with the flow channels 792, 794, 798, 800.

Referring to FIGS. 6, 8 and 10, the triangular-shaped raised portions, the acute trapezoidal-shaped raised portions, and the associated flow channels in the bottom half (shown in FIG. 8) of the bottom pan 60 will now be described.

The bottom plate portion 80, the side wall 97, and the triangular-shaped raised portions 250, 252 define the flow channel 480 therebetween.

The triangular-shaped raised portion 250 and the acute trapezoidal-shaped raised portion 254 and the bottom plate portion 80 define a flow channel 482. The flow channel 482 is disposed between outer surfaces of the triangular-shaped raised portion 250 and the acute trapezoidal-shaped raised portion 254 and fluidly communicates with the flow channel 480.

The triangular-shaped raised portion 252 and the acute trapezoidal-shaped raised portion 256 and the bottom plate portion 80 define a flow channel 484. The flow channel 484 is disposed between outer surfaces of the triangular-shaped raised portion 252 and the acute trapezoidal-shaped raised portion and fluidly communicates with the flow channel 480.

The triangular-shaped raised portion 250, the outer side wall portions 94, 96 and the bottom plate portion 80 define a flow channel 486 that fluidly communicates with the flow channel 480.

The triangular-shaped raised portion 252, the outer side wall portion 98, the inner side wall portion 118 (shown in FIG. 6) and the bottom plate portion 80 define a flow channel 488 that fluidly communicates with the flow channel 480.

The acute trapezoidal-shaped raised portions 254, 256 and the bottom plate portion 80 define a flow channel 490. The flow channel 490 is disposed between the acute trapezoidal-shaped raised portions 254, 256 and fluidly communicates with the flow channel 480.

The acute trapezoidal-shaped raised portions 254, 258 and the bottom plate portion 80 define a flow channel 492. The flow channel 492 is disposed between outer surfaces of the acute trapezoidal-shaped raised portions 254, 258 and fluidly communicates with the flow channels 482, 486.

The acute trapezoidal-shaped raised portions 256, 260 and the bottom plate portion 80 define a flow channel 494. The flow channel 494 is disposed between outer surfaces of the acute trapezoidal-shaped raised portions 256, 260 and fluidly communicates with the flow channels 484, 488.

The acute trapezoidal-shaped raised portions 258, 260 and the bottom plate portion 80 define a flow channel 496. The flow channel 496 is disposed between outer surfaces of the acute trapezoidal-shaped raised portions 258, 260 and fluidly communicates with the flow channels 492, 494.

The acute trapezoidal-shaped raised portion 258, the outer side wall portion 94 and the bottom plate portion 80 define a flow channel 498 that fluidly communicates with the flow channels 482, 486.

The acute trapezoidal-shaped raised portion 260, the inner side wall portion 118 and the bottom plate portion 80 define a flow channel 500 that fluidly communicates with the flow channels 484, 488.

The acute trapezoidal-shaped raised portions 274, 258 and the bottom plate portion 80 define a flow channel 682. The flow channel 682 is disposed between the acute trapezoidal-shaped raised portions 274, 258 and fluidly communicates with the flow channel 496.

The acute trapezoidal-shaped raised portions 260, 276 and the bottom plate portion 80 define a flow channel 684. The flow channel 684 is disposed between outer surfaces of the acute trapezoidal-shaped raised portions 260, 276 and fluidly communicates with the flow channel 496.

The acute trapezoidal-shaped raised portions 274, 276 and the bottom plate portion 80 define a flow channel 690. The flow channel 690 is disposed between the acute trapezoidal-shaped raised portions 274, 276 and fluidly communicates with the flow channel 496.

The acute trapezoidal-shaped raised portions 274, 278 and the bottom plate portion 80 define a flow channel 692. The flow channel 692 is disposed between outer surfaces of the acute trapezoidal-shaped raised portions 274, 278 and fluidly communicates with the flow channels 682, 498.

The acute trapezoidal-shaped raised portions 276, 280 and the bottom plate portion 80 define a flow channel 694. The flow channel 694 is disposed between outer surfaces of the acute trapezoidal-shaped raised portions 276, 280 and fluidly communicates with the flow channels 684, 500.

The acute trapezoidal-shaped raised portions 278, 280 and the bottom plate portion 80 define a flow channel 696. The flow channel 696 is disposed between outer surfaces of the acute trapezoidal-shaped raised portions 278, 280 and fluidly communicates with the flow channels 692, 694.

The acute trapezoidal-shaped raised portion 278, the outer side wall portion 94 and the bottom plate portion 80 define a flow channel 698 that fluidly communicates with the flow channels 682, 498.

The acute trapezoidal-shaped raised portion 280, the inner side wall portion 118 and the bottom plate portion 80 define a flow channel 700 that fluidly communicates with the flow channels 684, 500.

The acute trapezoidal-shaped raised portions 294, 278 and the bottom plate portion 80 define a flow channel 882. The flow channel 882 is disposed between the acute trapezoidal-shaped raised portions 294, 278 and fluidly communicates with the flow channel 696.

The acute trapezoidal-shaped raised portions 280, 296 and the bottom plate portion 80 define a flow channel 884. The flow channel 884 is disposed between outer surfaces of the acute trapezoidal-shaped raised portions 280, 296 and fluidly communicates with the flow channel 696.

The acute trapezoidal-shaped raised portions 294, 296 and the bottom plate portion 80 define a flow channel 890. The flow channel 890 is disposed between the acute trapezoidal-shaped raised portions 294, 296 and fluidly communicates with the flow channel 696.

The acute trapezoidal-shaped raised portions 294, 298 and the bottom plate portion 80 define a flow channel 892. The flow channel 892 is disposed between outer surfaces of the acute trapezoidal-shaped raised portions 294, 298 and fluidly communicates with the flow channels 882, 698.

The acute trapezoidal-shaped raised portion 296 and the triangular-shaped raised portion 300 and the bottom plate portion 80 define a flow channel 894. The flow channel 894 is disposed between outer surfaces of the acute trapezoidal-shaped raised portion 296 and the triangular-shaped raised portion 300 and fluidly communicates with the flow channels 884, 700.

The acute trapezoidal-shaped raised portion 298, the outer side wall portions 94, 92 and the bottom plate portion 80 define a flow channel 898 that fluidly communicates with the flow channels 882, 698.

The triangular-shaped raised portion 300, the inner side wall portions 116, 118, (shown in FIG. 6) and the bottom plate portion 80 define a flow channel 900 that fluidly communicates with the flow channels 884, 700.

The triangular-shaped raised portions 298, 300 and the bottom plate portion 80 define a flow channel 901. The flow channel 901 is disposed between the triangular-shaped raised portions 298, 300 and fluidly communicates with the flow channels 892, 894, 898, 900, and with the flow channel 802.

Figure 4:
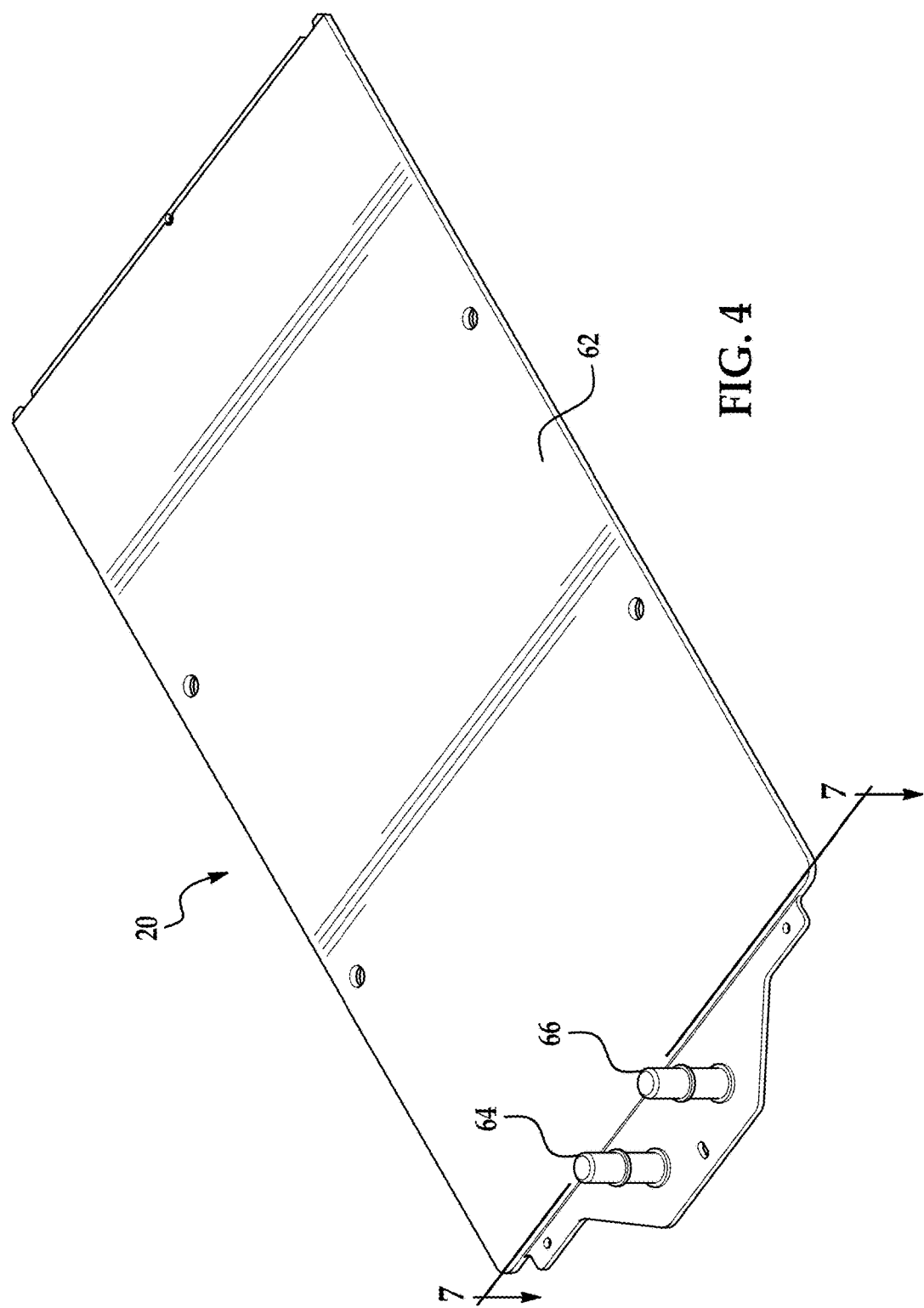
FIG. 4 is a schematic of a cooling plate utilized in the battery pack of FIG. 1.
Figure 5:
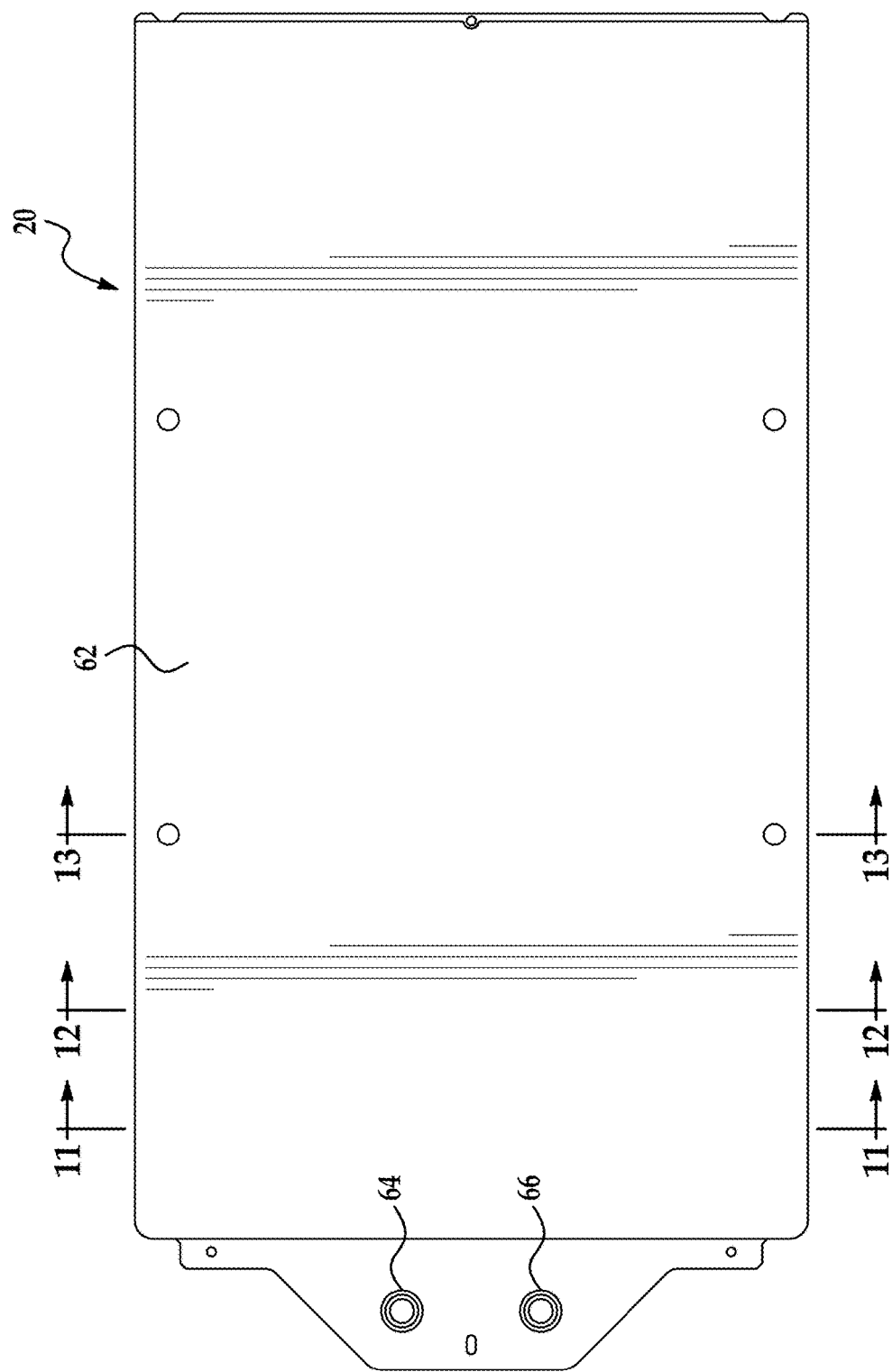
FIG. 5 is a schematic of a top view of the cooling plate of FIG. 4.
Figure 7:
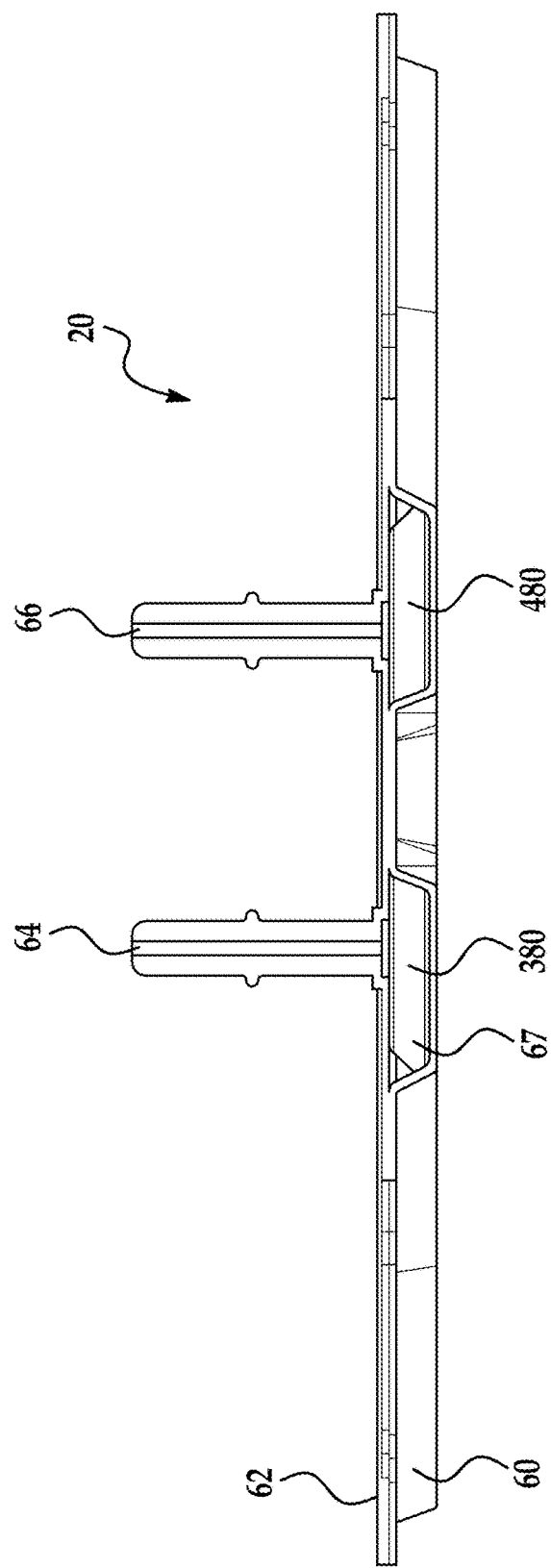
FIG. 7 is a cross-sectional schematic of the cooling plate of FIG. 4 taken along lines 7-7 in FIG. 4.

Referring to FIGS. 4 and 7, the top plate 62 is coupled to the bottom pan 62 and defines an interior enclosed region 67 therebetween. In an exemplary embodiment, the top plate 62 is constructed of a thermally conductive material such as aluminum for example.

The tubular input port 64 is coupled to the top plate 62 and fluidly communicates with the interior region 67 (and the flow path pattern 370 of the first cooling region 351 shown in FIG. 8) of the cooling plate 20. The tubular input port 64 receives a refrigerant from a refrigerant source (not shown) fluidly coupled to the tubular input port 64 and directs the refrigerant into the interior region 67 (and the flow path portion 380) such that the cooling plate 20 cools the battery modules 40, 42, 44.

The tubular outlet port 66 is coupled to the top plate 62 and fluidly communicates with the interior region 67 (and the flow path pattern 372 of the first cooling region 351 shown in FIG. 8) of the cooling plate 20. The tubular outlet port 66 receives the refrigerant from the interior region 67 and returns the refrigerant to a refrigerant source (not shown) fluidly coupled to the tubular outlet port 66.

Referring to FIGS. 8, 9, 10 and 14, the first, second, and third cooling regions 351, 352, 353 of the cooling plate 20 for cooling the battery modules 40, 42, 44, respectively, will now be explained.

The first cooling region 351 is disposed directly underneath the battery module 40 and is configured to maintain a temperature of the battery module 40 along a plane 1000 (shown in FIG. 3) within one degree Celsius of a first temperature level. The first cooling region 351 includes flow path patterns 370, 372 (shown in FIG. 9) that have substantially similar shapes to one another. The flow path patterns 370, 372 are separated from one another by the inner side wall portions 110, 118 (shown in FIG. 8). Referring to FIG.

14, a temperature gradient schematic obtained from heat transfer modeling software is illustrated. The temperature gradient schematic has a temperature gradient region 1010 measured along the plane 1000 in the battery module 40 indicating that a temperature of the battery module 40 is maintained within one degree Celsius of the first temperature level by the flow path patterns 370, 372.

Figure 9:
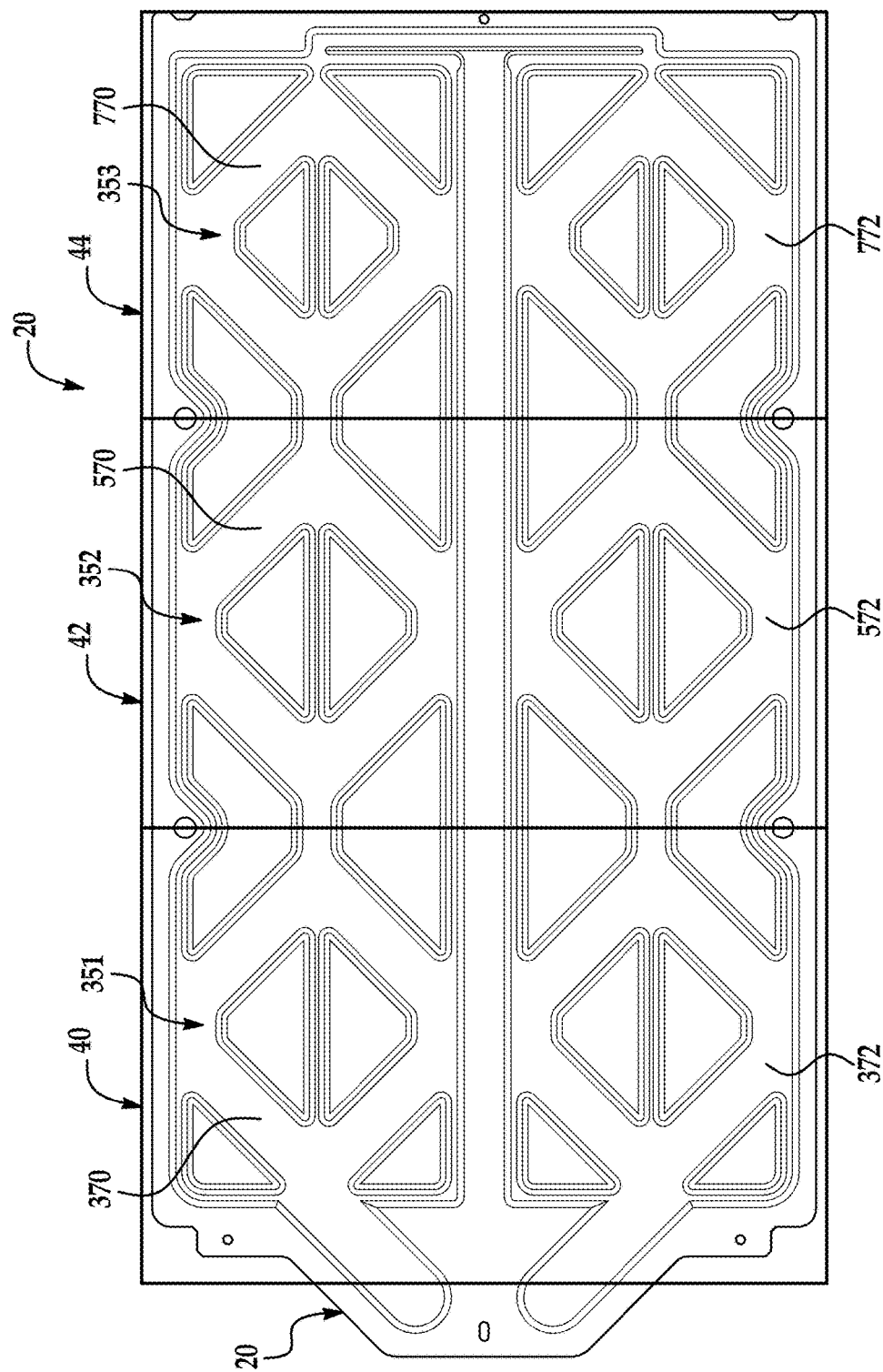
FIG. 9 is a schematic of the top view of the bottom pan of FIG. 8 with boundary lines indicating where first, second, and third battery modules are oriented above the bottom pan.

Referring to FIGS. 8-10, the flow path pattern 370 includes flow channels 380, 382, 384, 386, 388, 390, 392, 394, 396, 398, 400 and maintains a temperature of at least a first half of a cross-sectional area of the battery module 40 taken along a plane 1000 (shown in FIG. 3) within one degree Celsius of the first temperature level. The first half of the cross-sectional area of the battery module 40 is coincident and parallel with the plane 1000.

The flow path pattern 372 includes flow channels 480, 482, 484, 486, 488, 490, 492, 494, 496, 498, 500 and maintains a temperature of at least a second half of a cross-sectional area of the battery module 40 taken along the plane 1000 (shown in FIG. 3) within one degree Celsius of the first temperature level. The second half of the cross-sectional area of the battery module 40 is coincident and parallel with the plane 1000.

Figure 14:
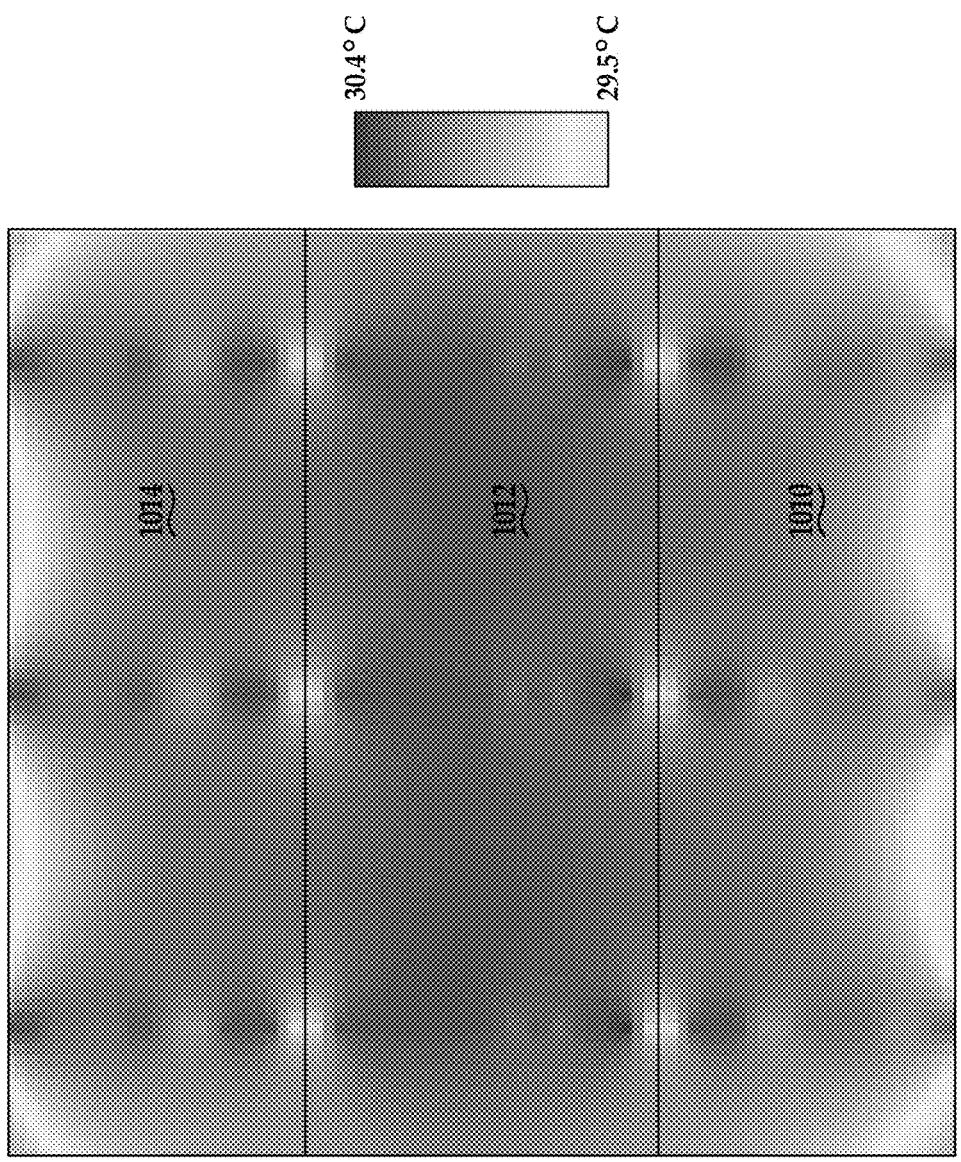
FIG. 14 is a temperature gradient schematic obtained from heat transfer modeling software indicating temperature levels of first, second, and third battery modules in the battery pack of FIG. 1 along a plane parallel and away from bottom surfaces of the first, second, and third battery modules.

The second cooling region 352 is disposed directly underneath the battery module 42 and is configured to maintain a temperature of the battery module 42 taken along the plane 1000 (shown in FIG. 3) within one degree Celsius of a first temperature level. The second cooling region 352 includes flow path patterns 570, 572 (shown in FIG. 9) that have substantially similar shapes to one another. The flow path patterns 570, 572 are separated from one another by the inner side wall portions 110, 118 (shown in FIG. 8). Referring to FIG. 14, a temperature gradient schematic obtained from heat transfer modeling software is illustrated. The temperature gradient schematic has a temperature gradient region 1012 measured along the plane 1000 in the battery module 42 indicating that a temperature of the battery module 42 is maintained within one degree Celsius of the first temperature level by the flow path patterns 570, 572.

Referring to FIGS. 8-10, the flow path pattern 570 includes flow channels 396, 398, 400, 582, 584, 590, 592, 594, 596, 598, 600 and maintains a temperature of at least a first half of a cross-sectional area of the battery module 42 taken along a plane 1000 (shown in FIG. 3) within one degree Celsius of the first temperature level. The first half of the cross-sectional area of the battery module 42 is coincident and parallel with the plane 1000.

The flow path pattern 572 includes flow channels 496, 498, 500, 682, 684, 690, 692, 694, 696, 698, 700 and maintains a temperature of at least a second half of a cross-sectional area of the battery module 42 taken along the plane 1000 (shown in FIG. 3) within one degree Celsius of the first temperature level. The second half of the cross-sectional area of the battery module 42 is coincident and parallel with the plane 1000.

The third cooling region 354 is disposed directly underneath the battery module 44 and is configured to maintain a temperature of the battery module 44 taken along the plane 1000 (shown in FIG. 3) within one degree Celsius of a first temperature level. The third cooling region 354 includes flow path patterns 770, 772 (shown in FIG. 9) that have substantially similar shapes to one another. The flow path patterns 770, 772 are separated from one another by the inner side wall portions 110, 118 (shown in FIG. 8). Referring to FIG. 14, a temperature gradient schematic obtained from heat transfer modeling software is illustrated. The temperature gradient schematic has a temperature gradient region 1014 measured along the plane 1000 in the battery module 44 indicating that a temperature of the battery module 44 is maintained within one degree Celsius of the first temperature level by the flow path patterns 770, 772.

Referring to FIGS. 8-10, the flow path pattern 770 includes flow channels 596, 598, 600, 782, 784, 790, 792, 794, 796, 798, 800, 802 and maintains a temperature of at least a first half of a cross-sectional area of the battery module 44 taken along a plane 1000 (shown in FIG. 3) within one degree Celsius of the first temperature level. The first half of the cross-sectional area of the battery module 44 is coincident and parallel with the plane 1000.

The flow path pattern 772 includes flow channels 696, 698, 700, 882, 884, 890, 892, 894, 896, 898, 900 and maintains a temperature of at least a second half of a cross-sectional area of the battery module 44 taken along the plane 1000 (shown in FIG. 3) within one degree Celsius of the first temperature level. The second half of the cross-sectional area of the battery module 44 is coincident and parallel with the plane 1000.

Referring to FIGS. 7-9, during operation, the refrigerant enters the tubular inlet port 64 and flows through the flow path pattern 370 of the first cooling region 351, the flow path pattern 570 of the second cooling region 352, the flow path pattern 770 of the third cooling region 353, the flow channel 802, the flow path pattern 772 of the third cooling region 353, the flow path pattern 572 of the second cooling region 352, the flow path pattern 372 of the first cooling region 351, and then exits the tubular outlet port 66.

Figure 3:
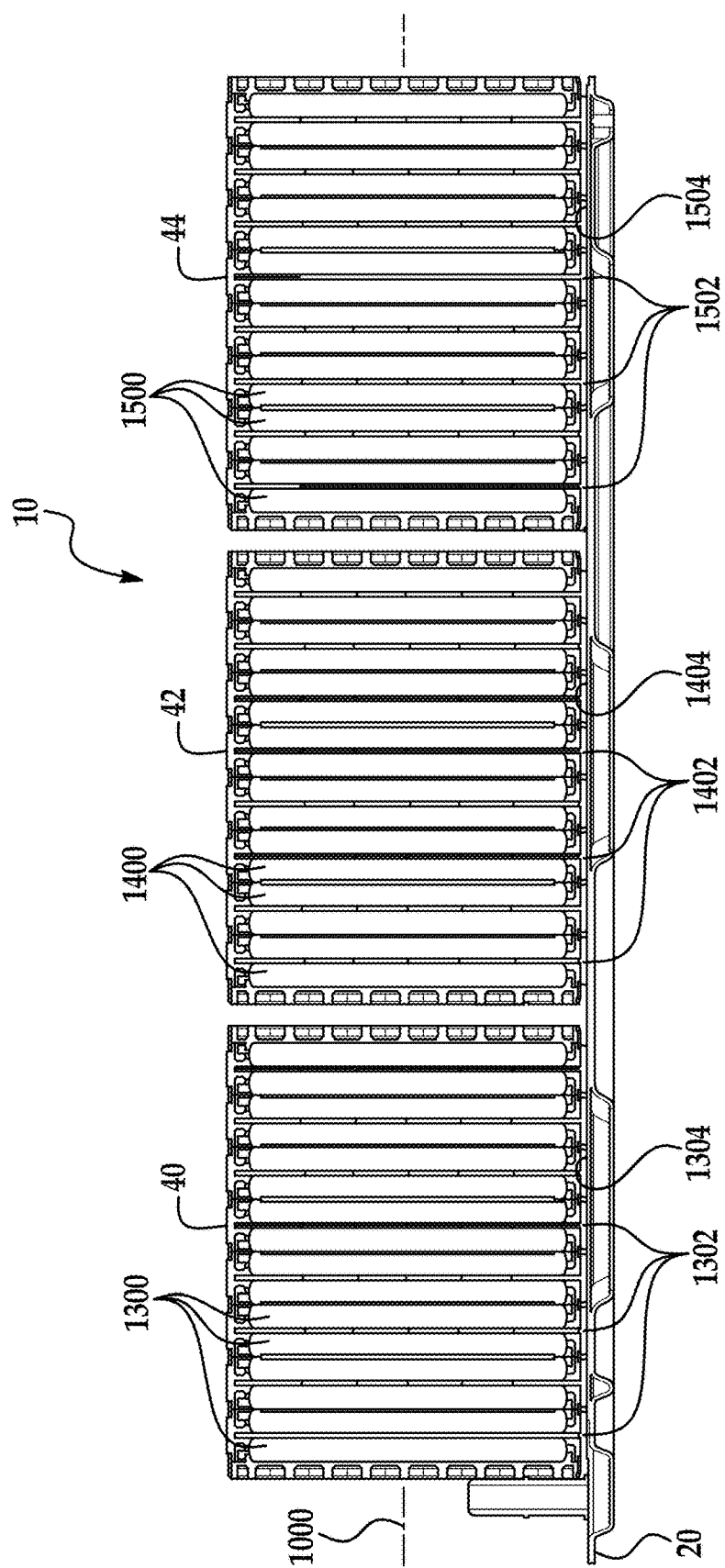
FIG. 3 is a cross-sectional view of the battery pack of FIG. 1 taken along lines 3-3 in FIG. 1.

Referring to FIGS. 1 and 3, the battery modules 40, 42, 44 are disposed on a top surface of the cooling plate 20.

The battery module 40 includes a plurality of battery cells 1300 and a plurality of thermally conductive plate members 1302. The plurality of battery cells 1300 are lithium-ion pouch battery cells that are each disposed in a direction that is perpendicular to the longitudinal axis 302 (shown in FIG. 8) of the cooling plate 20 and to the refrigerant flow direction. The plurality of thermally conductive plate members 1302 directly contact both the plurality of battery cells 1300 and the cooling plate 20 for transferring heat energy from the battery module 40 to the cooling plate 20. A bottom surface 1304 of the battery module 40 is parallel to the plane 1000.

The battery module 42 includes a plurality of battery cells 1400 and a plurality of thermally conductive plate members 1402. The plurality of battery cells 1400 are lithium-ion pouch battery cells that are each disposed in a direction that is perpendicular to the longitudinal axis 302 (shown in FIG. 8) of the cooling plate 20 and to the refrigerant flow direction. The plurality of thermally conductive plate members 1402 directly contact both the plurality of battery cells 1400 and the cooling plate 20 for transferring heat energy from the battery module 42 to the cooling plate 20. A bottom surface 1404 of the battery module 42 is parallel to the plane 1000.

The battery module 44 includes a plurality of battery cells 1500 and a plurality of thermally conductive plate members 1502. The plurality of battery cells 1500 are lithium-ion pouch battery cells that are each disposed in a direction that is perpendicular to the longitudinal axis 302 (shown in FIG. 8) of the cooling plate 20 and to the refrigerant flow direction. The plurality of thermally conductive plate members 1502 directly contact both the plurality of battery cells 1500 and the cooling plate 20 for transferring heat energy from the battery module 44 to the cooling plate 20. A bottom surface 1504 of the battery module 44 is parallel to the plane 1000.

The battery pack described herein provides a substantial advantage over other battery packs. In particular, the battery pack includes a cooling plate having a first flow path pattern that is shaped and sized to maintain a temperature of at least a first half of a cross-sectional area of a first battery module taken along a plane within one degree Celsius of a first temperature level, and a second flow path pattern that is shaped and sized to maintain a temperature of at least a second half of the cross-sectional area of the first battery module along the plane within one degree Celsius of the first temperature level.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery pack, comprising:
   a battery module having a bottom surface;
   a cooling plate having a bottom pan and a top plate that directly contact one another and are coupled together and define an interior region therebetween and extend along a longitudinal axis, the bottom surface being disposed on the top plate; and
   the bottom pan having a first cooling region with first and second flow path patterns therein that receive a refrigerant therethrough, the first flow path pattern being shaped and sized to maintain a temperature of at least a first half of a cross-sectional area of the battery module within one degree Celsius of a first temperature level, the second flow path pattern being shaped and sized to maintain a temperature of at least a second half of the cross-sectional area of the battery module within one degree Celsius of the first temperature level.

2. The battery pack of claim 1, wherein the bottom pan has first and second triangular-shaped raised portions that are coupled to and contact the top plate, the first and second triangular-shaped raised portions having a first flow channel therebetween within the interior region, the first flow channel defining a portion of the first flow path pattern.

3. The battery pack of claim 2, wherein the first cooling region of the bottom pan further includes first and second acute trapezoidal-shaped raised portions that are coupled to and contact the top plate, the first and second acute trapezoidal-shaped raised portions have a second flow channel therebetween that fluidly communicates with the first flow channel, the first acute trapezoidal-shaped raised portion having a third flow channel that extends around an outer surface of the first acute trapezoidal-shaped raised portion that fluidly communicates with the first flow channel; and the second acute trapezoidal-shaped raised portion having a fourth flow channel that extends around an outer surface of the second acute trapezoidal-shaped raised portion that fluidly communicates with the first flow channel; the second, third, and fourth flow channels defining a portion of the first flow path pattern.

4. The battery pack of claim 3, wherein the second flow channel extends substantially parallel to the longitudinal axis.

5. The battery pack of claim 3, wherein the first cooling region of the bottom pan further includes third and fourth acute trapezoidal-shaped raised portions in the interior region that are coupled to and contact the top plate, the third and fourth acute trapezoidal-shaped raised portions have a fifth flow channel therebetween that fluidly communicates with the second, third, and fourth flow channels; the fifth flow channel defining a portion of the first flow path pattern.

6. The battery pack of claim 1, wherein the battery module further includes a plurality of pouch battery cells that are each disposed in a first direction that is perpendicular to the longitudinal axis.

7. The battery pack of claim 1, wherein the first flow path pattern has a substantially similar shape as a shape of the second flow path pattern.

8. The battery pack of claim 1, wherein the bottom plate has an inner side wall portion that extends longitudinally along the longitudinal axis, the inner side wall portion being disposed between and separating the first flow path pattern from the second flow path pattern.

9. The battery pack of claim 1, further comprising a tubular inlet port that is coupled to the top plate and fluidly communicates with the first flow path pattern.

10. The battery pack of claim 9, further comprising a tubular outlet port that is coupled to the top plate and fluidly communicates with the second flow path pattern.

11. The battery pack of claim 1, wherein:
    the battery module having a first plane that extends through the battery module parallel to the bottom surface, and the first half of the cross-sectional area of the battery module and the second half of the cross-sectional area of the battery module being coincident and parallel with the first plane.

12. A battery pack, comprising:
    a battery module having a bottom surface and a first plane that extends through the battery module parallel to the bottom surface;
    a cooling plate having a bottom pan and a top plate that directly contact one another and are coupled together and define an interior region therebetween and extend along a longitudinal axis, the bottom surface being disposed on the top plate; and
    the bottom pan having a first cooling region with first and second flow path patterns therein that receive a refrigerant therethrough, the bottom pan having first and second triangular-shaped raised portions that are coupled to and contact the top plate, the first and second triangular-shaped raised portions having a first flow channel therebetween within the interior region, the first flow channel defining a portion of the first flow path pattern, the first flow path pattern being shaped and sized to maintain a temperature of at least a first half of a cross-sectional area of the battery module within one degree Celsius of a first temperature level, the second flow path pattern being shaped and sized to maintain a temperature of at least a second half of the cross-sectional area of the battery module within one degree Celsius of the first temperature level, the first half of the cross-sectional area of the battery module and the second half of the cross-sectional area of the battery module being coincident and parallel with the first plane.

13. The battery pack of claim 12, wherein the first cooling region of the bottom pan further includes first and second acute trapezoidal-shaped raised portions that are coupled to and contact the top plate, the first and second acute trapezoidal-shaped raised portions have a second flow channel therebetween that fluidly communicates with the first flow channel, the first acute trapezoidal-shaped raised portion having a third flow channel that extends around an outer surface of the first acute trapezoidal-shaped raised portion that fluidly communicates with the first flow channel; and the second acute trapezoidal-shaped raised portion having a fourth flow channel that extends around an outer surface of the second acute trapezoidal-shaped raised portion that fluidly communicates with the first flow channel; the second, third, and fourth flow channels defining a portion of the first flow path pattern.

* * * * *